(12) United States Patent
Diao et al.

(10) Patent No.: US 8,935,788 B1
(45) Date of Patent: Jan. 13, 2015

(54) TWO STAGE VIRUS DETECTION

(75) Inventors: Lili Diao, Nanjing (CN); Vincent Chan, Nanjing (CN); Patrick Mg Lu, Nanjing (CN)

(73) Assignee: Trend Micro Inc., Tokyo (JP)

( * ) Notice: Subject to any disclaimer, the term of this patent is extended or adjusted under 35 U.S.C. 154(b) by 1646 days.

(21) Appl. No.: 12/252,205

(22) Filed: Oct. 15, 2008

(51) Int. Cl.
*G06F 11/30* (2006.01)
*G06F 21/56* (2013.01)

(52) U.S. Cl.
CPC ............ *G06F 21/564* (2013.01); *G06F 21/561* (2013.01)
USPC .......................................................... 726/24

(58) Field of Classification Search
USPC .......................................................... 726/24
See application file for complete search history.

(56) References Cited

U.S. PATENT DOCUMENTS

| | | | |
|---|---|---|---|
| 5,960,170 A * | 9/1999 | Chen et al. ................. | 714/38.14 |
| 6,886,099 B1 * | 4/2005 | Smithson et al. ............... | 726/24 |
| 7,809,670 B2 * | 10/2010 | Lee et al. ......................... | 706/59 |
| 8,001,603 B1 * | 8/2011 | Kennedy .......................... | 726/24 |
| 2005/0081053 A1 * | 4/2005 | Aston et al. .................... | 713/200 |
| 2007/0240217 A1 * | 10/2007 | Tuvell et al. ..................... | 726/24 |
| 2009/0031162 A1 * | 1/2009 | Bose et al. ......................... | 714/2 |

\* cited by examiner

*Primary Examiner* — Andrew Georgandellis
(74) *Attorney, Agent, or Firm* — Beyer Law Group LLP

(57) ABSTRACT

A two stage virus detection system detects viruses in target files. In the first stage, a training application receives a master virus pattern file recording all known virus patterns and generates a features list containing fundamental virus signatures from the virus patterns, a novelty detection model, a classification model, and a set of segmented virus pattern files. In the second stage, a detection application scans a target file for viruses using the generated outputs from the first stage rather than using the master virus pattern file directly to do traditional pattern matching. The results of the scan can vary in detail depending on a fuzzy scan level. For fuzzy scan level "1," the existence of a virus is returned. For fuzzy scan level "2," the grant virus type found is returned. For fuzzy scan level "3," the exact virus name is returned. This invention provides a solution for the problems caused by traditional virus detection solution: slow scanning speed, big pattern file, big burden on computation resource (CPU, RAM etc.), as well as heavy pattern updating traffic via networks.

9 Claims, 6 Drawing Sheets

TWO STAGE VIRUS DETECTION

FIELD OF THE INVENTION

The present invention relates to virus detection technology, more specifically, it relates to improving the efficiency of virus detection by dividing the virus scanning procedure into multiple user selectable levels.

BACKGROUND OF THE INVENTION

Traditional virus detection applications employ simple pattern matching algorithms to detect viruses. In general, pattern matching algorithms search a target file for a set of known virus patterns that represent a set of known viruses. Each virus pattern is represented by one or more digital "virus signatures," each digital virus signature storing a 0/1 digital block. If all signatures of a known virus pattern are found in the target file, the detection application concludes that the file contains the corresponding known virus.

FIG. 1 illustrates an example of a simple pattern matching algorithm. The pattern matching algorithm may be implemented in a virus detection application running on a computer system. When a file to be scanned for viruses ("scan target file") is received, simple pattern matching algorithm 100 attempts to match the contents of the file with the contents of virus pattern file 110. Virus pattern file 110 contains a set recognizable virus patterns from Information Security Service Provider ('ISSP'). Each virus pattern contains one or more digital virus signatures, offsets, and sizes (in bytes). Generally, the virus pattern file is stored within the memory of the computer system, is cached when a scan is performed, and is periodically updated for new viruses discovered by the ISSP. These updates may be received through a network. Pattern matching algorithm 100 retrieves each virus pattern from the virus pattern file and compares it against scan target file 130 for a match. The matching consists of comparing the digital signature of each virus pattern with a plurality of consecutive bytes in scan target file 130. The number of consecutive bytes and the starting position of those bytes are indicated by the size and offset of the virus pattern.

In this example, virus pattern 120 has multiple signatures, one of which stores a value of 1017 in offset parameter 121 and a value of 16 in size parameter 122. When pattern matching algorithm 100 attempts to match virus pattern 120 with scan target file 130, it will traverse all signatures related to virus pattern 120 to check if all signatures exist in scan target file 130. For example, for the signature with offset of 1017, the algorithm jumps 1017 bytes from the beginning of scan target file 130 and then compares 16 consecutive bytes with digital signature 123. If a match is found, a signature of pattern 120 is found. If all signatures of pattern 120 can be found in the scan target file 130, the algorithm concludes that the virus corresponding to virus pattern 120 exists within scan target file 130. Alternatively, the offset may be used to indicate the relative distance from another signature in the virus pattern file.

Although traditional simple pattern matching algorithms work well in many virus detection applications, there are continuing efforts to further improve the pattern matching algorithms for better performance. This is especially desirable when the number of virus patterns is dramatically increased. This increase may result from newly discovered viruses or mutations of existing viruses. Possible sources of mutation include small variations in the signature or offset of the virus pattern. For example, two viruses may have the same digital signature but a slightly different offset, or have similar signatures with only a few different bytes.

An increase in the number of virus patterns proportionately increases the time and resources required to perform the virus detection since the simple pattern matching algorithm must iterate through a larger number of virus patterns. Generally, it is desirable for the virus detection application to minimize CPU time when checking the scan target file. If the delay experienced by the user is too long, the user may become impatient and not use the virus detection application. Furthermore, an increase in the number of virus patterns proportionately increases the size of the virus pattern file. A larger virus pattern file increases the memory consumption of the virus detection application since the virus pattern file must be read during the pattern matching algorithm. This may be undesirable to the user if the computer system has limited resources.

An increase in the number of virus programs also increases the usage of network resources required to update the virus pattern file. For example, the ISSP may periodically send the virus detection application an updated version of the virus pattern file which includes newly discovered virus patterns. The transmission of the virus pattern file to the virus detection application is through a network. Depending on the size of the virus pattern file, the updating of the virus pattern file may create a bottleneck for the network.

Therefore, it would be beneficial if a pattern matching algorithm were created that is able to lower memory consumption and detect viruses more rapidly to provide a solution for the problems caused by traditional virus detection solutions such as slow scanning speed, big pattern files, big burden on computation resource (CPU, RAM etc.), as well as heavy pattern updating traffic via networks

SUMMARY OF THE INVENTION

A variety of methods and arrangements for improving the efficiency of virus detection are described. Generally, the virus scanning procedure is divided into multiple levels of scanning wherein each level performs a set of operations. A scanning level is selected depending upon the user's requirements. To realize this, various machine learning approaches are employed to establish models to replace traditional virus pattern files and/or virus pattern matching procedures. Exemplary models may include Novelty Detection Models and Classification Models. Additionally, a traditional virus pattern file containing virus patterns is divided into multiple segregated virus pattern files. This results in fewer iterations of pattern matching when detecting viruses. The described method may be incorporated into a computer device or may be provided in computer readable medium that is executable on a computer device.

In one embodiment, a method is described for detecting a virus in a target file. The method includes (a) locating in the target file, one or more virus features belonging to a features list, wherein the features list contains virus features extracted from a set of virus patterns that represent known viruses (each feature can be considered a dimension to construct a feature space), (b) receiving a set of feature vectors that defines a Novelty Detection (machine learning) Model (a super-ball encapsulating all the feature vectors in the feature space), each of said feature vectors representing virus features of one of said virus patterns, (c) generating a target feature vector from the one or more located virus features representing said target file, (d) determining that the target feature vector is located within the said Novelty Detection Model (the super-ball in the feature space), (e) determining that the target feature vector belongs to a virus group from a plurality of virus groups via Classification (machine learning) Model, wherein the virus group contains at least one of said feature vectors, and (f) matching the scan target file against traditional virus patterns stored within a segmented virus pattern file, wherein the segmented virus pattern file is associated with the virus group.

BRIEF DESCRIPTION OF THE DRAWINGS

The invention and the advantages thereof, may best be understood by reference to the following description taken in conjunction with the accompanying drawings in which.

In the drawings, like reference numerals are used to designate like structural elements. It should also be appreciated that the depictions in the figures are diagrammatic and not to scale.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention relates generally to methods and arrangements for improving a virus detection application. More particularly, the present invention improves the performance of a virus detection application by minimizing the number of slow pattern matching operations performed when scanning an unknown file (i.e. a scan target file) for viruses. In a preferred embodiment of the present invention, the virus scanning procedure is divided into three different "fuzzy" scanning levels. The first fuzzy scan level determines whether the target file is suspicious enough to be infected by a virus. The second fuzzy scan level determines whether the target file belongs to one of the predefined virus groups. The third fuzzy scan level determines the exact name of the virus found. Users may freely choose any scanning level according to their scan requirements. Each scanning level utilizes one or more machine learning approaches including Novelty Detection and Classification models. The Classification model divides a traditional virus pattern file containing virus patterns into multiple segregated virus pattern files. This improves the efficiency of locating the exact name of a virus in the third fuzzy scan level by minimizing the required number of time intensive pattern matching operations.

Virus Detection System

Figure 1:
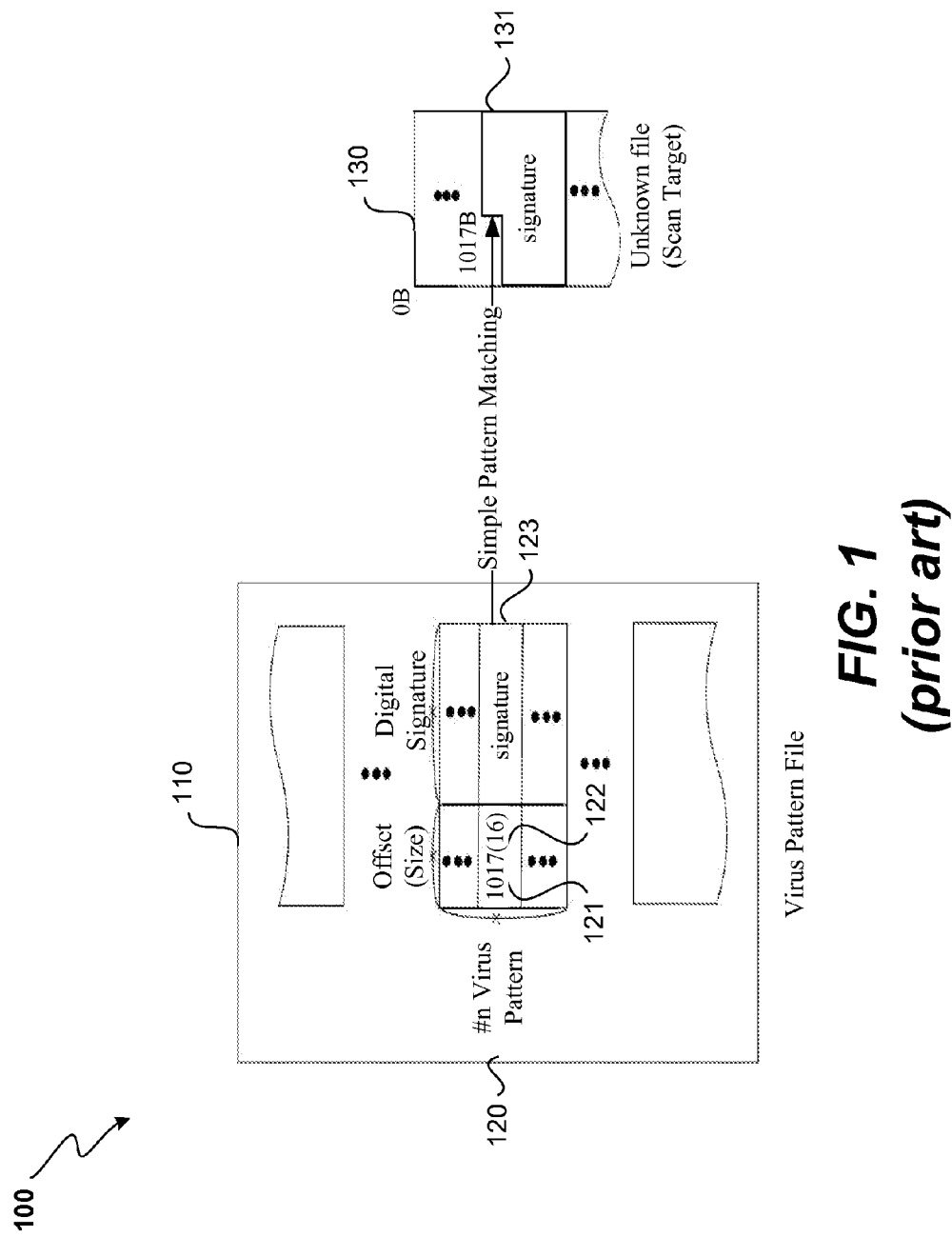
FIG. 1 illustrates an example of a simple pattern matching algorithm.
Figure 2:
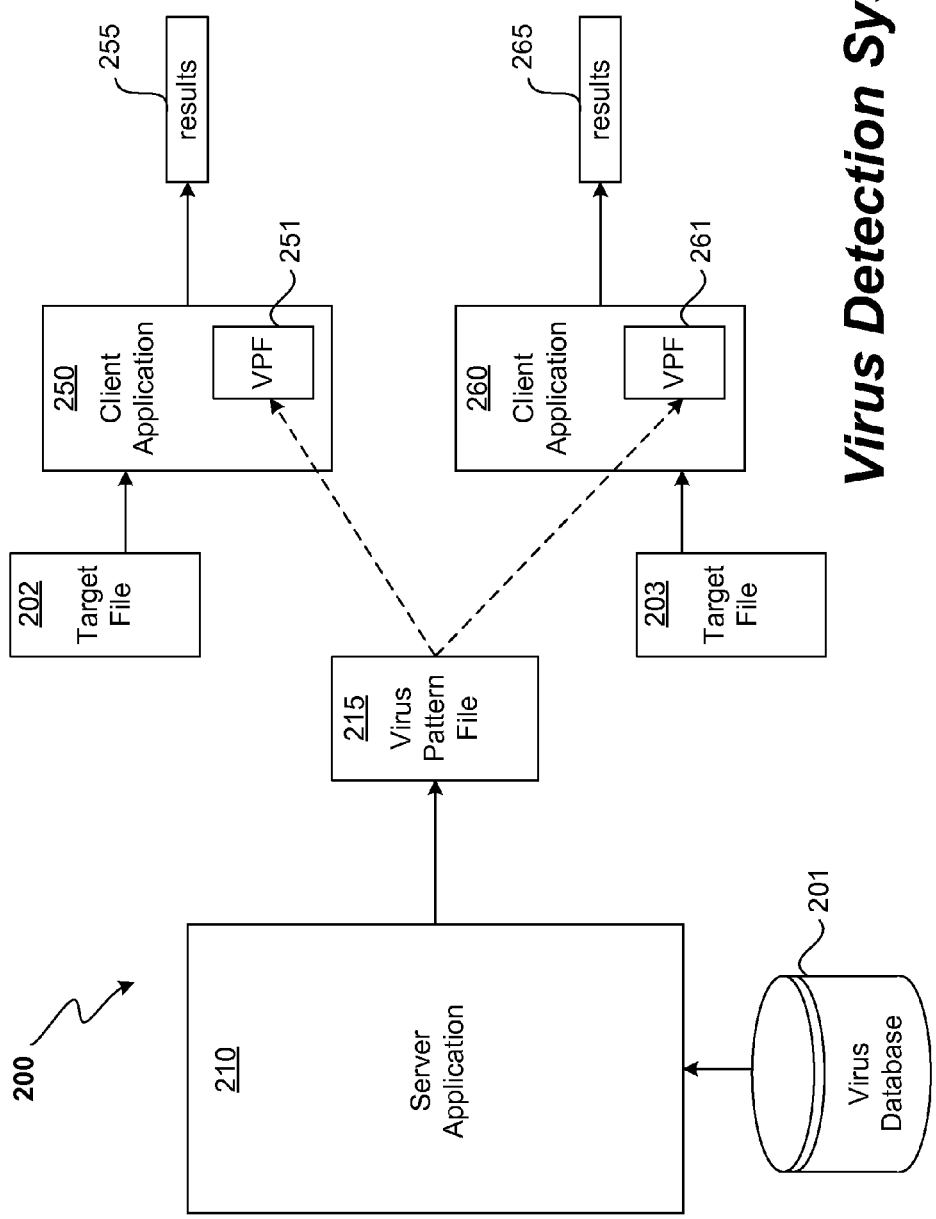
FIG. 2 illustrates an example of a traditional virus detection system.

FIG. 2 illustrates an example of a traditional virus detection system 200. Traditionally, virus detection systems are created on the server side by Information Security Service Providers ('ISSPs') for providing virus detection services to consumers. A basic virus detection system will include one or more client applications for detecting viruses in target files and a server application for supporting the client applications. When scanning for viruses, the client application residing on customer computers will compare the file contents of a target file against a local copy of a virus pattern within the ISSP. A local copy of known virus patterns is required in order to allow client applications to detect viruses without communication with the ISSP. In one example, the client application may periodically scan a memory storage coupled to a client device for viruses. In another example, the application may scan unknown target files before they are accessed for the first time. The client application communicates with the server application when support tasks such as receiving an update for the local copy of known virus patterns from the virus database are required.

Here, virus detection system 200 includes server application 210 and client applications 250 and 260. Server application 210 supports the client applications by updating local copies of the virus patterns when they are not synchronized with the ISSP. Server application 210 is coupled to virus database 201. Virus database 201 stores information relating to viruses recognized by ISSP. Generally, virus database 201 will store virus patterns extracted from all known virus samples. Virus patterns generally include one or more virus signatures. Each virus signature includes an offset parameter describing where the virus signature is found within a file, a size parameter describing the length of the virus signature in a number of bytes, and a virus signature parameter describing the string of digital bits that represents a certain part of the virus. When all known virus patterns are gathered together, they are stored within a virus pattern file ("VPF"). A VPF may be used as a local copy of the virus database stored in client applications. In this example, VPFs 251 and 261 store a local copy of virus database 201 within client applications 250 and 260, respectively.

Occasionally, the client application's VPF may not be synchronized with virus database 201. Viruses not located within the VPF of the client application are ignored during the scanning process even though the ISSP has knowledge of that given virus. To remedy this, client applications 250 and 260 may periodically send a request for server application 210 to update VPFs 251 and 261, thereby synchronizing them with the current state of the virus database on the ISSP. This allows the client applications to detect viruses recognized by the ISSP.

Here, server application 210 will access virus database 201 and generate VPF 215 when synchronization is requested by the client application. VPF 215 includes a copy of the virus patterns stored within virus database 201. VPF 215 is subsequently transmitted to client 250 or 260 and stored as VPF 251 or VPF 261, respectively. The new VPF overwrites the current VPF and is used when scanning target files for viruses. For example, client application 250 will access VPF 251 when scanning target file 202. The result of the scan will be output as results 255. Similarly, client application 260 will access VPF 261 when scanning target file 203 and will generate results 265.

Figure 3:
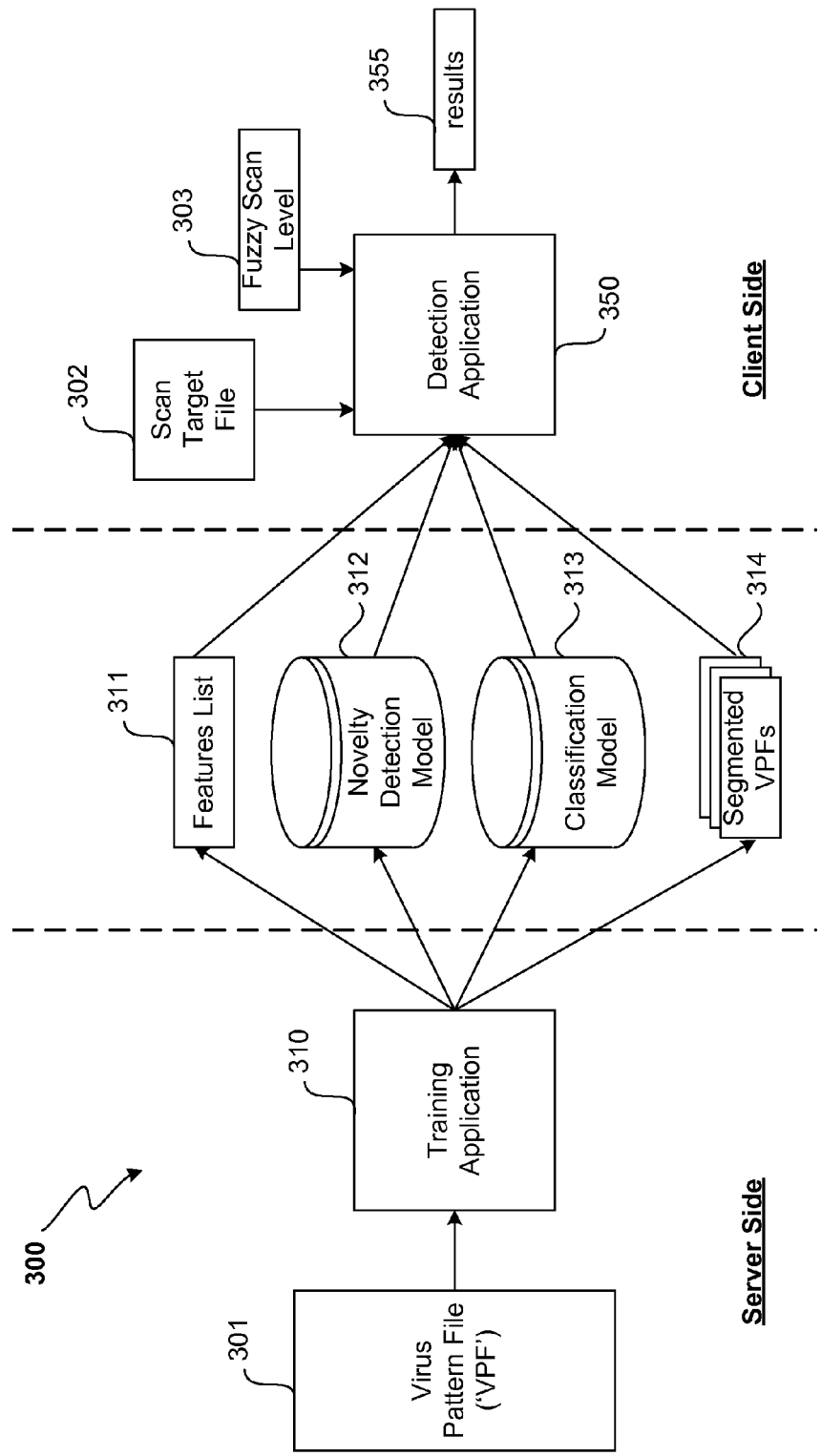
FIG. 3 is a functional block diagram that diagrammatically illustrates a virus detection system in accordance with one embodiment of the present invention.

FIG. 3 is a functional block diagram that diagrammatically illustrates a virus detection system in accordance with one embodiment of the present invention. System 300 includes a server side comprising training application 310 and a client side comprising detection application 350. In contrast with traditional server side applications that simply transfer the recognized virus patterns to the client application in a single VPF, the server side of system 300 preprocesses the viruses recognized by the ISSP through training application 310 (as training stage). As a result of the preprocessing, training application 310 generates a plurality of outputs. These outputs are received and used by detection application 350 (as detection stage) in the client side to improve efficiency when scanning files for viruses. The training application and the detection application are discussed in detail below.

Training Application

Training application 310 receives the virus patterns recognized by the ISSP from VPF 301. Alternatively, training application 310 may also receive the virus patterns from virus database 201 in FIG. 2. The virus patterns are processed by training application 310 to generate a plurality of elements that individually or in combination, represent the virus patterns in VPF 301. In this embodiment, the elements generated by training application 310 are features list 311, novelty detection model 312, classification model 313, and segmented virus pattern file 314. The function and structure of these elements will be discussed in succession below. It is to be understood by those skilled in the art that other machine learning approaches may also be combined to perform the functionality described below.

Features list 311 is a list containing virus features that are found in the virus patterns of VPF 301. A virus feature may be a fundamental building block of a virus signature or combination of multiple signatures. To generate features list 311, training application 310 iterates through the virus patterns in VPF 301 to extract virus features selected from all virus signatures. This process may include mechanisms to perform functions including, but not limited to, extracting, organizing, splitting, combining, evaluating, and ranking the importance of virus features. Mechanisms to perform feature selection are well known in the art. Only the signatures with importance high enough may be selected as features. Once these virus features are collected, a features list of mutually independent virus features is generated. While this is one approach to represent and extract features, it is understood by those skilled the art that there are many other approaches available.

Novelty detection model 312 represents a machine learning approach for determining whether a target file is possibly infected by a known virus. The novelty detection model aims to establish a mathematical model for the set of known viruses. In Novelty Detection context, the set of know viruses is regarded as the class of "old". Each known virus can be converted to a feature vector via aforementioned feature extraction process with regards to corresponding virus pattern and feature list, and each feature vector can be mapped to a sample data point in a feature space. The feature space is a multi-dimensional space defined by the virus features from features list 311 (each feature constructs a dimension). As an example of feature vector conversion, assume three features A, B, and C in the features list form a 3-dimensional feature space (A, B, C). A virus pattern that contains features B and C but not A may be described by feature vector (0, 1, 1). Similarly, a virus pattern that contains features A and C but not B may be described as feature vector (1, 0, 1). The novelty detection model aims to create an optimized "super-ball" that tightly encapsulates all sample data points in that feature space. To create the novelty detection model, each virus pattern from VPF 301 is converted into first a feature vector representing a data point within the feature space.

Once all the virus patterns have been converted to data points and placed within the feature space by the training application, the novelty detection model is then used to create a mathematical model that surrounds all the data points (instances of said "old" class). The mathematical model includes a border that encompasses the data points of all known viruses. This border, which may be characterized as the surface of a "super-ball," may be used by the novelty detection model to quickly determine whether a received target file contains a known virus. For instance, if the received target file generates a data point outside the border, the novelty detection model concludes that the target file is uninfected (i.e. does not contain a known virus). Alternatively, if the received target file generates a data point inside the border, the novelty detection model concludes that the target file may possibility contain a known virus. As a result, the target file may be labeled as a suspicious target file. By storing the border information as Novelty Detection Model, machine learning algorithms can quickly determine whether a target file is possibly infected by a known virus. Popular Novelty Detection algorithms include one-class SVM and one-class Naïve Bayes classifier, etc.

Classification model 313 represents a machine learning approach for determining whether the contents of a target file contain viruses from one of a plurality of virus groups. Classification model 313 classifies a target file as belonging to a virus group. If the target file is found to belong to a virus group, there is a likelihood that the target file will match, through pattern matching, a virus within the virus group. If a match is not eventually found through pattern matching, then the target file may be uninfected or a zero-day virus (virus that is not known by the ISSP server) exists within the target file. Similarly, if the target file is found to not belong to a virus group, then the classification model can conclude that all viruses within all virus groups are not found in the target file. In this case, the target file is uninfected or a zero-day virus exists within the target file. As described, classification model 313 allows the detection application to determine whether the target file is uninfected and if not uninfected, which virus group the target file belongs to. This may improve the computation time by limiting the number of target files that require the pattern matching operation with a virus pattern. It is noted that the infection status of a target file is only with respect to the viruses recognized by the ISSP. Therefore, a target file containing a virus not recognized by the ISSP may be labeled as uninfected even though it contains a zero-day virus. If the user desires to locate zero-day viruses, other means such as "scan in-the-cloud" (via a network requesting a scan by an ISSP) or "virtual machine simulation" may be also implemented.

Various methods may be implemented when organizing the viruses into virus groups by the training application. In one embodiment, one method of organizing virus patterns is to group them by virus type. This includes grouping together viruses that are within the same family. Generally, viruses may mutate and create variations of the same virus. For instance, mutations of a virus may contain the same virus signature parameter as the parent virus but a different offset parameter. In other embodiments, other methods such as clustering may also be used to organize viruses into virus groups. These methods may group the virus patterns into a preset number of virus groups, thereby controlling the granularity of the clustering. Some clustering methods also can search for optimal clusters representing virus groups. Once the virus groups have been formed, a machine learning approach generates a multi-class classification model for use in determining whether a specific feature vector from a target file belongs within one of the plurality of virus groups. There are many machine learning approaches to generate multi-class classifications such as decision trees and neural networks etc.

Segmented VPF 314 contains a plurality of virus pattern files. Each pattern file corresponds to a given virus group. During detection, when the classification model determines that the feature vector of a target file belongs to a virus group, pattern matching is performed between the target file and only the virus patterns stored within that segment of the segmented VPF that corresponds to the determined virus group. To generate the segmented VPF, training application 310 groups the virus patterns within VPF 301 into segments based upon the virus groups created from the previous grouping.

Detection Application

In one embodiment, detection application 350 resides on the client side of system 300 for scanning scan target file 302. Scan target file 302 may be stored in the client memory or may be received from an external device. During operation, detection application 350 may perform various fuzzy scan levels of scanning on scan target file 302. For instance, a thorough scan will return the name of the virus found while a fast scan will predict whether a virus exists in the scan target file. Depending on the user's resources and needs, one scan level may be more preferable over another. For instance, a thorough scan must be performed when results of the virus name is required. However, if knowledge of the virus type or a prediction of the existence of a virus is adequate, other scan levels may be better suited since they may be performed faster with less memory consumption. The desired scan level is controlled by setting fuzzy scan level 303.

In the described embodiment, there are three possible fuzzy scan levels. Fuzzy scan level "1" performs a course level scan that predicts whether scan target file 302 is suspicious enough to be infected by a virus. The course scan utilizes features list 311 to convert scan target file 302 into a feature vector and novelty detection model 312 to predict whether the feature vector resides within the border of the "super-ball" in the feature space that represents all known viruses. These functions are performed rather quickly and require little memory. As a result, this scan level is appropriate for scanning applications that require high throughput and high scan speed, such as gateway virus scanning. Once the prediction is made, it is output as results 355. If more accuracy is desired, fuzzy scan level "2" or "3" may be more appropriate.

Fuzzy scan level "2" performs an intermediate level scan for determining whether scan target file 302 belongs to one of the predefined virus groups. Belonging to a virus group signifies that the scan target file may contain the type of virus that populates the virus group. To perform fuzzy scan level "2", features list 311, novelty detection model 312, and classification model 313 are loaded into memory. Similar to fuzzy scan level "1," features list 311 converts scan target file 302 into a feature vector while novelty detection model 312 determines whether the feature vector resides within the border of the "super-ball" in the feature space that represents all known viruses. If the feature vector is within the border of the "super-ball," classification model 313 will determine the type of virus that has infected the scan target file. In one embodiment, the virus type is based upon the predefined virus group that the feature vector belongs to. Once the virus group is determined, the results are outputted as results 355. If the actual name of the virus is desired rather than the virus group that the virus belongs to, fuzzy scan level "3" may be selected.

Fuzzy scan level "3" provides a user with the exact name of the virus found. The results are similar to the output of traditional virus pattern matching. While fuzzy scan level "3" is the most labor and memory intensive scan level, it does provide the most accurate results out of the three fuzzy scan levels. To perform fuzzy scan level "3," features list 311, novelty detection model 312, classification model 313, and segmented VPF 314 are loaded into memory. The tasks of fuzzy scan level "2" are performed to determine the virus group that the target scan file belongs to. Subsequently, the segment of segmented VPF corresponding to the identified virus group is accessed and pattern matching is performed between the scan target file and the virus patterns within that particular segment. Once an exact match has been found, detection application returns the name of the virus pattern that was matched. Information belonging to this virus pattern (such as its name) may then be output as results 355.

Although three different scan levels have been described above, it is to be understood by those skilled in the art that other fuzzy scan levels are also possible.

Virus Detection Algorithm

Figure 4A:
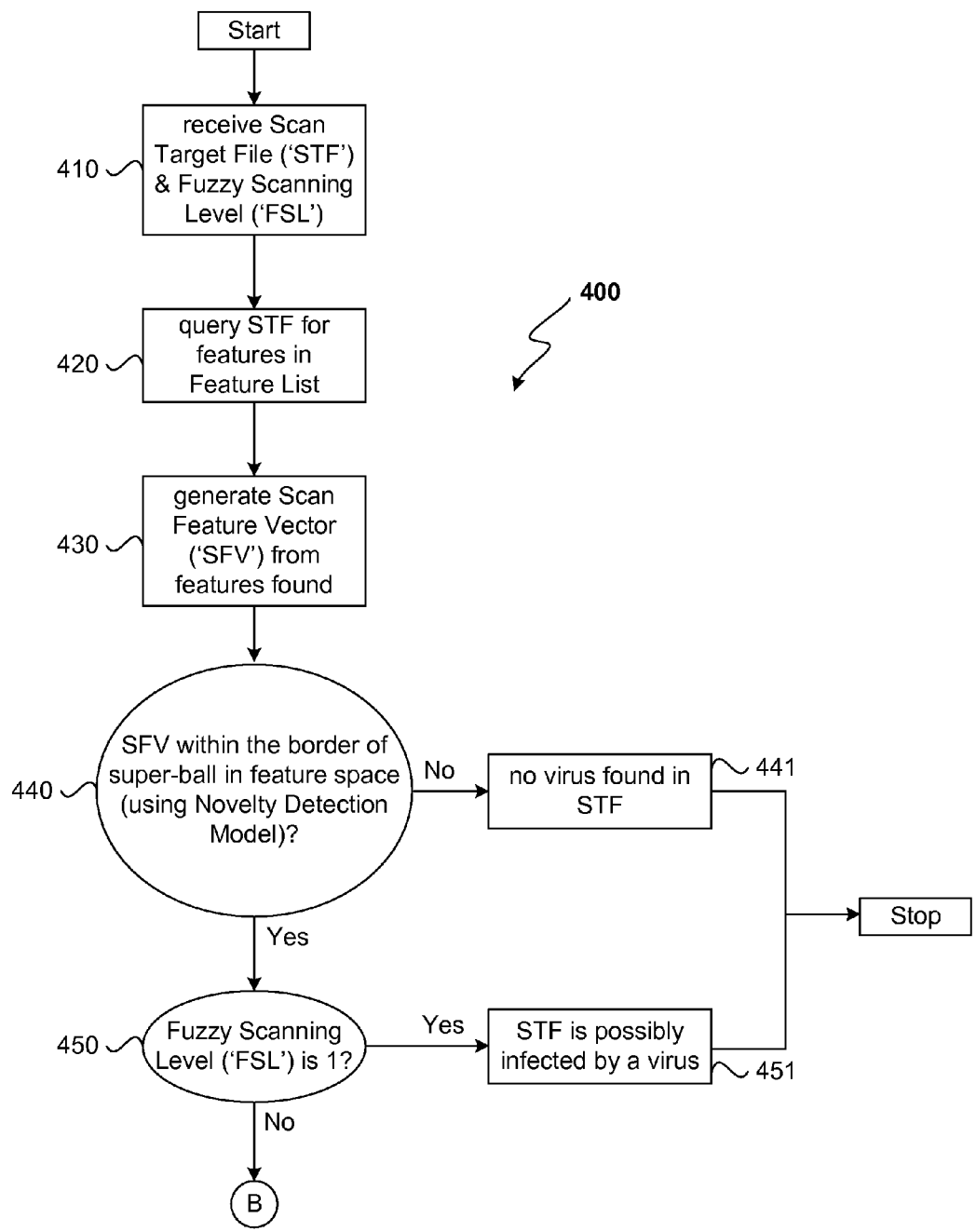
FIGS. 4A and 4B is a process flow diagram illustrating a method of detecting a virus (as Application stage) that is incorporated in some embodiments of the present invention.
Figure 4B:
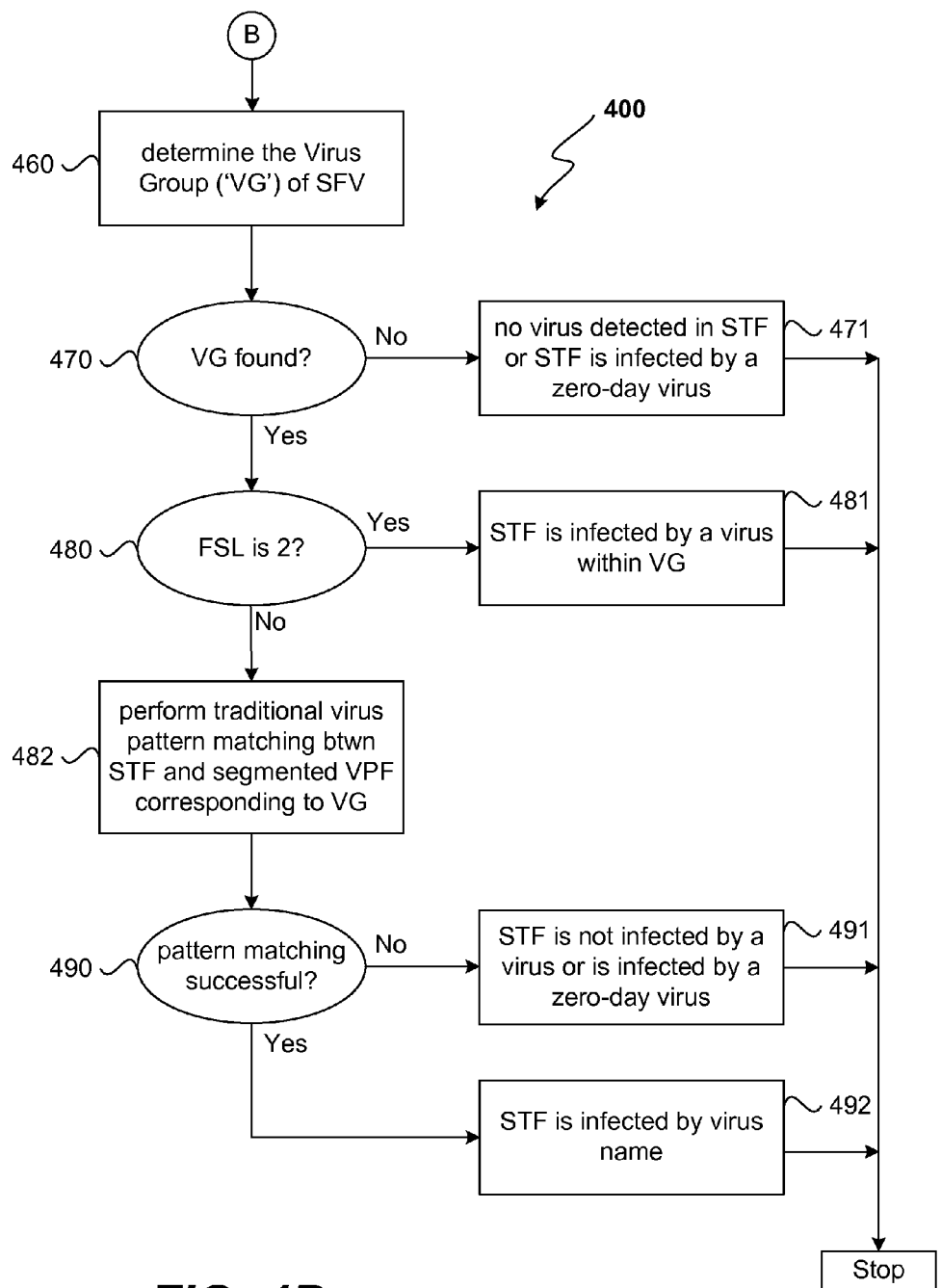

FIG. 4 is a process flow diagram illustrating a method of detecting a virus according to some embodiments of the present invention. All of the following steps may be performed by virus detection application 350 in FIG. 3. Process flow 400 begins in FIG. 4A at step 410 by receiving a scan target file and a fuzzy scanning level. At step 420, a query is performed for virus features belonging to feature list 311 that might appear in the scan target file. Once the virus features are located, they are combined at step 430 to generate a scan feature vector for the target file. At condition 440, the novelty detection model determines whether the scan feature vector is within a mathematical model (said "super-ball") that encompasses all known viruses. If the scan feature vector is not within the mathematical model (said "super-ball"), process flow 400 concludes that the standard target file does not contain a known virus at step 441 and stops. Alternatively, a finding that the scan feature vector is within the borders of the mathematical model (said "super-ball") implies that it is possible the scan target file contains a virus. At this point, process flow 400 may continue with more detailed scanning, depending on condition 450. Condition 450 checks the fuzzy scan level received in step 410. If the fuzzy scanning level is 1, the user only desires to know if the scan target file is infected. Therefore, process flow 400 concludes that the scan target file is possibly infected at step 451 and stops.

If the fuzzy scan level is not 1 (i.e., fuzzy scan level is 2 or 3) at condition 450, then the user desires more detailed scanning. As a result, process flow 400 continues to FIG. 4B. At this point, the classification model is suspicious that the scan target file is infected by a virus. At step 460, the classification model examines the scan feature vector to determine whether it belongs to a predefined virus group. The results of the classification model are used by condition 470 to determine whether a virus was found. If the virus feature vector does not match any of the predefined virus groups, the process flow 400 concludes that no virus is detected in the scan target file at step 471 and stops. However, if a matching predefined virus group was found, the process flow 400 continues to condition 480.

Condition 480 checks the level of the fuzzy scan level to determine whether further processing is desired. If the fuzzy scan level is 2, then the process flow has met the user's desires. As a result, the process flow reports that the STF is infected by a virus within the virus group at step 481 and stops. However, if the fuzzy scan level is not 2, then the user must have requested the only remaining fuzzy scan level (i.e. fuzzy scan level 3).

Fuzzy scan level 3 is the most detailed scan out of the three available scan levels. Thus, at step 482 traditional virus pattern matching is performed between the scan target file and that particular segment of the segmented virus pattern file that corresponds to the matched virus group. Each virus pattern within that segment virus is pattern matched against the scan target file. Once the pattern matching has been completed, condition 490 checks whether the pattern matching was successful. If a virus pattern was not found to match the scan target file, then the result is that the scan target file is not infected by a virus at step 491 (or a zero-day virus has been found) and the process stops. Alternatively, if a virus pattern was found to match, then the result is that the scan target file is infected by the virus represented by the matched virus pattern at step 492 and the process stops.

Virus Pattern File Training Algorithm

Figure 5:
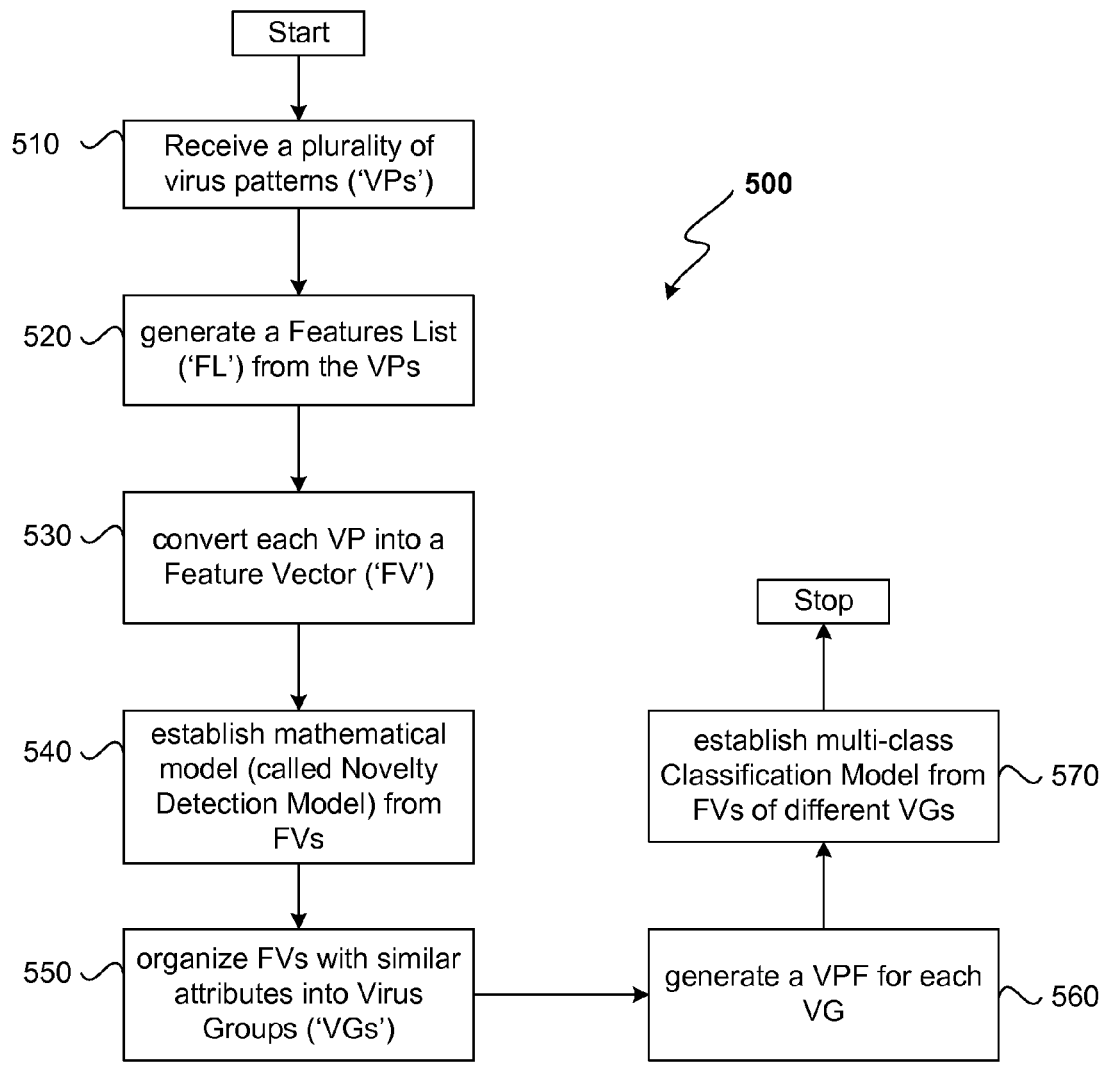
FIG. 5 is process flow diagram illustrating a method of preprocessing a set of virus patterns (as Training stage) that is incorporated in some embodiments of the present invention.

FIG. 5 is process flow diagram illustrating a method of preprocessing a set of known virus patterns by training application 310. Process flow 500 begins at step 510 by receiving a set of virus patterns. The set may include a virus pattern corresponding to each virus that is recognizable by the ISSP. In one embodiment, the virus patterns are received in a virus pattern file. In another embodiment, the virus patterns are received from a virus pattern database. Once all virus patterns have been successfully received, step 520 generates a features list (i.e. list of mutually independent virus features) from the virus patterns. This may be accomplished by first selecting virus features from the virus patterns signatures and then combining the virus features into a features list. The generation of the features list has been described above.

After the features list has been generated, each virus pattern is converted into a feature vector at step 530. The conversion is performed by analyzing the virus pattern for virus features within the features list and grouping the virus features found into a feature vector. Subsequently at step 540, the novelty detection algorithm establishes a mathematical model (called Novelty Detection Model) from all of the feature vectors. The Novelty Detection model includes a multi-dimensional super-ball that represents all known virus patterns, where the border of the super-ball encapsulates the data points of the feature vectors corresponding to the virus patterns as they are presented in the feature space. This multi-dimensional super-ball border is a useful tool for the novelty detection model to quickly determine whether an unknown file possibly contains a known virus. For example, an unknown file is converted into a feature vector. If the feature vector mapped as a data point in the feature space does not fall within the multi-dimensional super-ball border, then the unknown file does not contain a known virus. Similarly, if the unknown feature vector falls within the multi-dimensional border, the unknown file possibly does contain a known virus.

Besides Novelty Detection model generation, the feature vectors of all known virus are organized into virus groups in accordance to attributes of the feature vectors at step 550. The organization may be based upon a variety of factors including the virus signature or the virus type. At step 560, a virus pattern file is generated for each virus group. The virus pattern file contains the virus patterns corresponding to the feature vectors within the virus group. A multi-class classification model is then established from the virus groups at step 570. The multi-class classification model is capable of characterizing a feature vector as belonging to one of the virus groups.

It is to be understood by those skilled in the art that process flow 500 does not need to be performed in the order shown in FIG. 5. Other variations are also able to achieve the same performance. For instance, establishing Novelty Detection model step 540 may be performed after organizing feature vectors step 550. Similarly, generating virus pattern files step 560 may be performed after establish classification model step 570.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:

1. A method of detecting a virus in a target file comprising:
   receiving a scan level, wherein said scan level is a first scan level, a second scan level or a third scan level;
   locating in the target file, using a computer, one or more target virus features belonging to a features list, wherein the features list contains virus features extracted from a set of virus patterns in a virus pattern file that represent known viruses, said set of virus patterns defining a border within a feature space;
   generating a target feature vector from the one or more located target virus features representing said target file;
   determining whether said target feature vector is located within said border of the feature space and ending said method of detecting when it is determined that said target feature vector is not located within said border;
   when said scan level is said second scan level or said third scan level and it is determined that said target feature vector is located within said border, determining whether the target file belongs to a virus group from a plurality of virus groups and ending said method of detecting when it is determined that said target file does not belong to one of said virus groups; and
   when said scan level is said third scan level and it is determined that said target file belongs to a virus group from said plurality of virus groups, matching the target file against a subset of said set of virus patterns stored within a segment of said virus pattern file, wherein the segment of said virus pattern file is associated with the virus group.

2. A method as recited in claim 1 wherein said set of virus features are mutually independent of one another.

3. A method as recited in claim 2 wherein said feature space is a multi-dimensional space and each dimension represents one of said mutually independent virus features.

4. A method as recited in claim 1 further comprising:
converting the set of known virus patterns into a set of feature vectors;
generating said border of a super-ball in the feature space that encapsulates the set of feature vectors; and
creating a novelty detection model using said border, wherein said novelty detection model is used in said first determining.

5. A method as recited in claim 1 further comprising:
grouping said set of virus patterns into said plurality of virus groups based upon their feature vectors; and
creating a classification model from said plurality of virus groups, wherein said classification model is used in said second determining.

6. A method as recited in claim 1 further comprising:
grouping said set of virus patterns into said plurality of virus groups based upon their feature vectors; and
segmenting said virus pattern file by said grouping to create said segment of said virus pattern file.

7. A method as recited in claim 1 further comprising:
outputting a result indicating that no virus, a possible virus infection, a virus group or a named virus is found within said target file.

8. A non-transitory computer-readable medium comprising computer code for detecting a virus in a target file, said computer code of said computer-readable medium effecting the following:
receiving a scan level, wherein said scan level is a first scan level, a second scan level or a third scan level;
locating in the target file, using a computer, one or more target virus features belonging to a features list, wherein the features list contains virus features extracted from a set of virus patterns in a virus pattern file that represent known viruses, said set of virus patterns defining a border within a feature space;
generating a target feature vector from the one or more located target virus features representing said target file;
determining whether said target feature vector is located within said border of the feature space and ending said method of detecting when it is determined that said target feature vector is not located within said border;
when said scan level is said second scan level or said third scan level and it is determined that said target feature vector is located within said border, determining whether the target file belongs to a virus group from a plurality of virus groups and ending said method of detecting when it is determined that said target file does not belong to one of said virus groups; and
when said scan level is said third scan level and it is determined that said target file belongs to a virus group from said plurality of virus groups, matching the target file against a subset of said set of virus patterns stored within a segment of said virus pattern file, wherein the segment of said virus pattern file is associated with the virus group.

9. A non-transitory computer-readable medium as recited in claim 8 further comprising code for:
outputting a result indicating that no virus, a possible virus infection, a virus group or a named virus is found within said target file.

* * * * *